US009221631B2

(12) United States Patent
Breeden, III et al.

(10) Patent No.: US 9,221,631 B2
(45) Date of Patent: Dec. 29, 2015

(54) LOADING RAMP (71) Applicant: WINSTON PRODUCTS LLC, Cleveland, OH (US)

(72) Inventors: Winston Breeden, III, Chagrin Falls, OH (US); Thaddeus T. Brej, Rocky River, OH (US); Robert C. Johnson, Montville, OH (US)

(73) Assignee: WINSTON PRODUCTS LLC, Cleveland ( * ) Notice: Subject to any disclaimer, the term of this patent is extended or adjusted under 35 U.S.C. 154(b) by 0 days.

(21) Appl. No.: 14/327,999

(22) Filed: Jul. 10, 2014

(65) Prior Publication Data
US 2015/0013081 A1    Jan. 15, 2015

Related U.S. Application Data (60) Provisional application No. 61/844,561, filed on Jul. 10, 2013, provisional application No. 61/953,007, filed on Mar. 14, 2014.

(51) Int. Cl.
*B65G 69/30* (2006.01)
(52) U.S. Cl.
CPC ..................... *B65G 69/30* (2013.01)
(58) Field of Classification Search
CPC .... B65G 69/28; B65G 69/2811; B65G 69/30; E04F 11/002; E04F 11/00; E04F 2011/005; B60P 1/43; B60P 1/435; B66F 7/243; B63B 27/14; B63B 27/143
See application file for complete search history.

(56) References Cited

U.S. PATENT DOCUMENTS

| 6,139,249 | A  | * | 10/2000 | Lucht .......................... 414/537 |
| 6,643,878 | B2 | * | 11/2003 | Schmaltz et al. ............. 14/69.5 |
| 7,299,517 | B1 | * | 11/2007 | Adinolfe ........................ 14/69.5 |
| 8,256,053 | B2 | * | 9/2012  | Astor et al. .................... 14/69.5 |
| 8,448,278 | B1 | * | 5/2013  | Beilstein ........................ 14/69.5 |
| 8,495,779 | B2 | * | 7/2013  | Metcalfe et al. ............... 14/69.5 |
| 8,561,238 | B1 | * | 10/2013 | Inget .............................. 14/71.1 |
| 8,821,102 | B1 | * | 9/2014  | Boguslawski ................ 414/537 |
| 8,944,743 | B2 | * | 2/2015  | Astor et al. .................... 414/537 |
| 2004/0083562 | A1 | * | 5/2004 | Leblanc ......................... 14/69.5 |
| 2006/0200919 | A1 | * | 9/2006 | Frahm et al. .................. 14/69.5 |
| 2009/0016865 | A1 | * | 1/2009 | Astor et al. .................. 414/430 |
| 2014/0230167 | A1 | * | 8/2014 | Romanak et al. ............. 14/69.5 |

* cited by examiner

*Primary Examiner* — Abigail A Risic
(74) *Attorney, Agent, or Firm* — Cooper Legal Group LLC (57) ABSTRACT

A loading ramp is supported between a first surface and a second surface. The loading ramp includes a first ramp portion. The first ramp portion includes a first rail portion extending between a first end and an opposing second end. The first ramp portion includes at least one first tread portion removably attached to the first rail portion. The at least one first tread portion supports a weight. The loading ramp includes a second ramp portion attached to the first ramp portion. The second ramp portion includes a second rail portion extending between a third end, which is attached to the second end of the first rail portion, and an opposing fourth end. The second ramp portion includes at least one second tread portion removably attached to the second rail portion. The at least one second tread portion supports the weight.

18 Claims, 11 Drawing Sheets

LOADING RAMP

CROSS REFERENCE TO RELATED APPLICATIONS

This application claims the benefit of U.S. Provisional Application Nos. 61/844,561, filed on Jul. 10, 2013, and 61/953,007, filed on Mar. 14, 2014, the entire disclosures of which are hereby incorporated herein by reference.

TECHNICAL FIELD

The instant application is generally directed towards a loading ramp and, in particular, to a loading ramp that can support a weight and extend between two surfaces.

BACKGROUND

A loading ramp can be used to support one or more objects. For example, a loading ramp can support a vehicle, snowmobile, motorcycle, etc. The loading ramp can be positioned to extend between a first surface and a second surface. As such, the vehicle can be moved from the first surface to the second surface by moving across/over the loading ramp. Loading ramps can be relatively long in length and may be cumbersome when stored/stowed. Furthermore, loading ramps are sometimes needed to support a relatively heavy weight, such as the heavy weights associated with vehicles. As such, it would be beneficial to provide for a loading ramp that is relatively easily stored/stowed while being able to support relatively heavy weights thereupon.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a loading ramp can be supported between a first surface and a second surface. The loading ramp includes a first ramp portion configured to be supported on the first surface. The first ramp portion includes a first rail portion extending between a first end, which is supported on the first surface, and an opposing second end. The first rail portion extends along a first non-linear axis. The first ramp portion includes at least one first tread portion removably attached to the first rail portion. The at least one first tread portion can support a weight when the least one first tread portion is attached to the first rail portion. The loading ramp can include a second ramp portion attached to the first ramp portion and configured to be supported on the second surface. The second ramp portion includes a second rail portion extending between a third end, which is attached to the second end of the first rail portion, and an opposing fourth end, which is supported on the second surface. The second rail portion extends along a second non-linear axis. The second ramp portion includes at least one second tread portion removably attached to the second rail portion. The at least one second tread portion can support the weight when the at least one second tread portion is attached to the second rail portion.

In another example, a loading ramp can be supported between a first surface and a second surface. The loading ramp includes a first ramp portion configured to be supported on the first surface. The first ramp portion includes a first rail portion extending between a first end, which is supported on the first surface, and an opposing second end. The first rail portion extends along a non-linear axis. The first ramp portion includes at least one first tread portion removably attached to the first rail portion. The at least one first tread portion can support a weight when the least one first tread portion is attached to the first rail portion. The loading ramp includes a second ramp portion movably attached to the first ramp portion and configured to be supported on the second surface. The second ramp portion includes a second rail portion extending between a third end, which is movably attached to the second end of the first rail portion, and an opposing fourth end, which is supported on the second surface. The second rail portion extends along a non-linear axis. The second ramp portion includes at least one second tread portion removably attached to the second rail portion. The at least one second tread portion can support the weight when the at least one second tread portion is attached to the second rail portion. The second ramp portion is movable with respect to the first ramp portion between an extended position, in which the first ramp portion is supported on the first surface and the second ramp portion is supported on the second surface, and a folded position, in which the first ramp portion and the second ramp portion can nest with each other with the first ramp portion having a substantially matching shape to the second ramp portion.

In another example, a loading ramp can be supported between a first surface and a second surface. The loading ramp includes a first ramp portion configured to be supported on the first surface. The first ramp portion includes a first rail portion extending between a first end, which is supported on the first surface, and an opposing second end. The first rail portion including a first rail and at least one first tread portion removably attached to the first rail of the first rail portion. The at least one first tread portion defines a first tread opening into which the first rail is removably received when the at least one first tread portion is removably attached to the first rail of the first rail portion.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Figure 1:
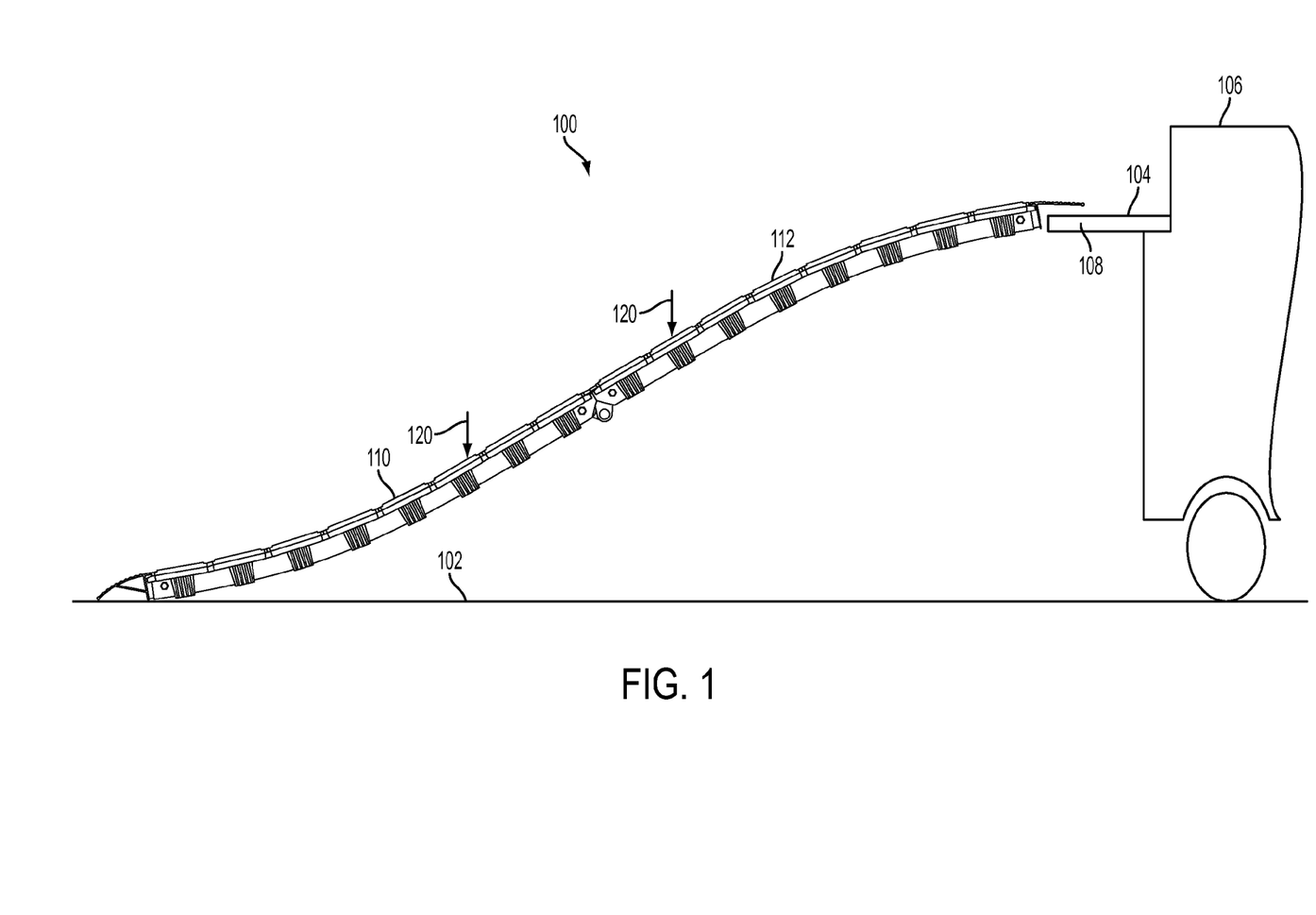
FIG. 1 is a side view of an example loading ramp supported between a first surface and a second surface.

Turning to FIG. 1, a loading ramp 100 is illustrated. The loading ramp 100 can be supported between a first surface 102 and a second surface 104. In an example, the first surface 102 may include a floor, the ground, or any other surface upon which an object may rest.

The second surface 104 may, in some examples, be elevated with respect to the first surface 102. In the illustrated example, the second surface 104 is located at a height above the first surface 102. The second surface 104 can include, for example a vehicle 106 (e.g., car, truck, boat, plane, etc.) and/or a part of the vehicle 106. In this example, the second surface 104 includes a part of a tailgate 108 of the vehicle 106, such that the tailgate 108 supports the loading ramp 100. The second surface 104 is not limited to including the vehicle 106, and, in other examples, may include nearly any type of surface.

While the second surface 104 is illustrated as being elevated with respect to the first surface 102, the loading ramp 100 is not limited to being used in such a situation. Rather, in some examples, the first surface 102 may be elevated with respect to the second surface 104. Further, the first surface 102 and the second surface 104 can be substantially planar with respect to each other.

In any of the aforementioned examples, the loading ramp 100 can be supported at one end by the first surface 102 and at an opposing end by the second surface 104. In these examples, the loading ramp 100 can include a first ramp portion 110 and a second ramp portion 112. The first ramp portion 110 and the second ramp portion 112 can be attached with respect to each other. The first ramp portion 110 can be supported on the first surface 102. The second ramp portion 112, which is attached to the first ramp portion 110, can be supported on the second surface 104. In an example, a bottom end (e.g., a first end) of the first ramp portion 110 is substantially planar with respect to the first surface 102. Similarly, in an example, a top end (e.g., a fourth end) of the second ramp portion 112 is substantially planar with respect to the second surface 104.

In operation, the loading ramp 100 can support a weight 120. It will be appreciated that the weight 120 is generically/schematically illustrated because the weight 120 includes any number of structures, objects, etc. For example, the weight 120 may include a second vehicle, such as a motorcycle, all-terrain vehicle (ATV), snowmobile, etc. Further, these second vehicles may include zero or more tires/wheels, such that the weight 120 may be applied at a plurality (e.g., one or more) of locations along the loading ramp 100. In some examples, the loading ramp 100 comprises a plurality of loading ramps 100 (e.g., one or more), such that the plurality of loading ramps 100 can be supported between the first surface 102 and the second surface 104. In such an example, the loading ramps 100 can be positioned in a side by side configuration, so as to support vehicles that have a plurality of tires, such as all-terrain vehicles with four or six tires or the like. For ease of illustration, FIG. 1 illustrates a single loading ramp 100, though, in other examples, a plurality of loading ramps 100 may be provided.

Figure 2:
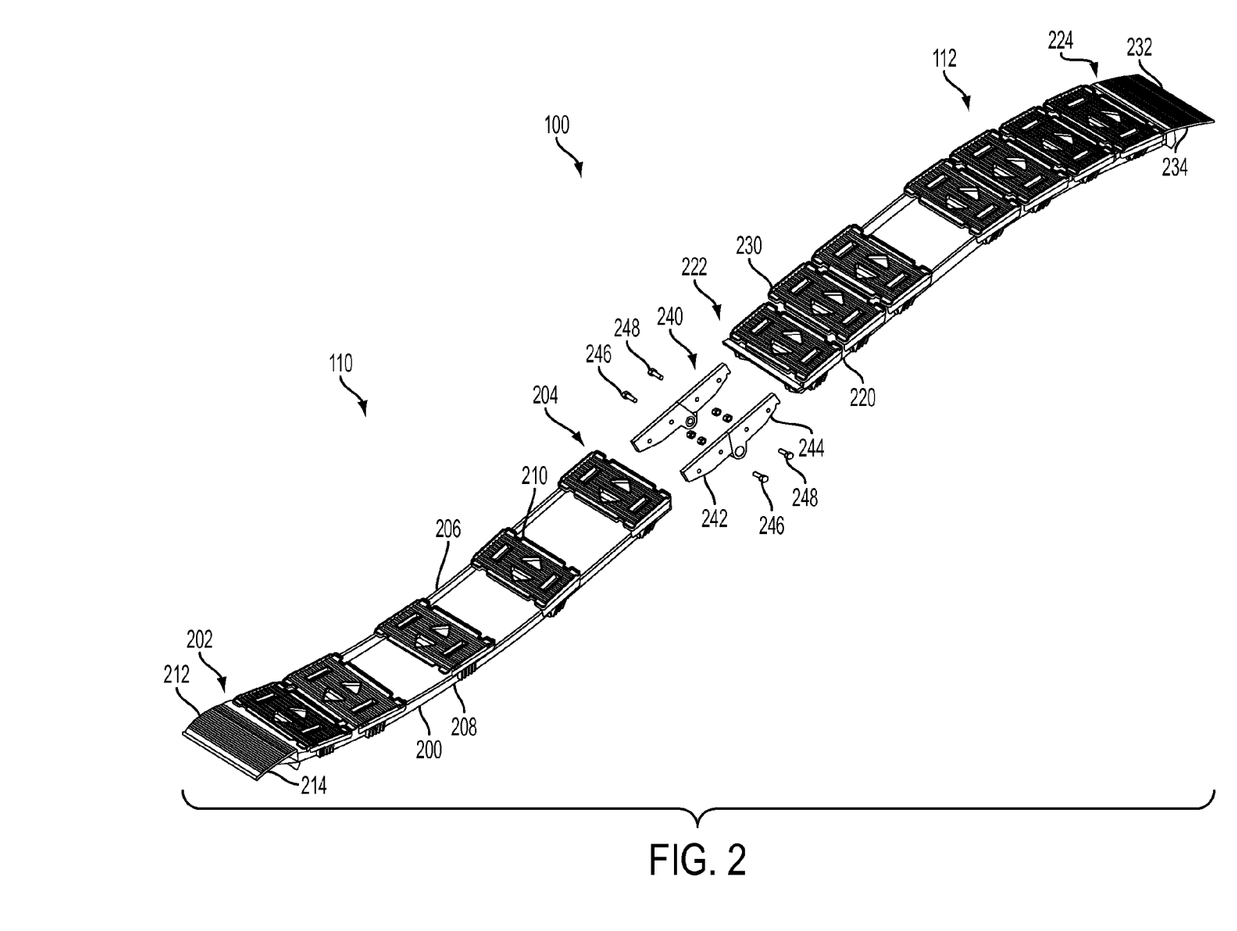
FIG. 2 is a perspective view of the partially exploded loading ramp of FIG. 1.

Turning to FIG. 2, a partially exploded perspective view of the loading ramp 100 is illustrated. The loading ramp 100 may include the first ramp portion 110. In some examples, the first ramp portion 110 can be positioned at a lower elevation than the second ramp portion 112.

Figure 5:
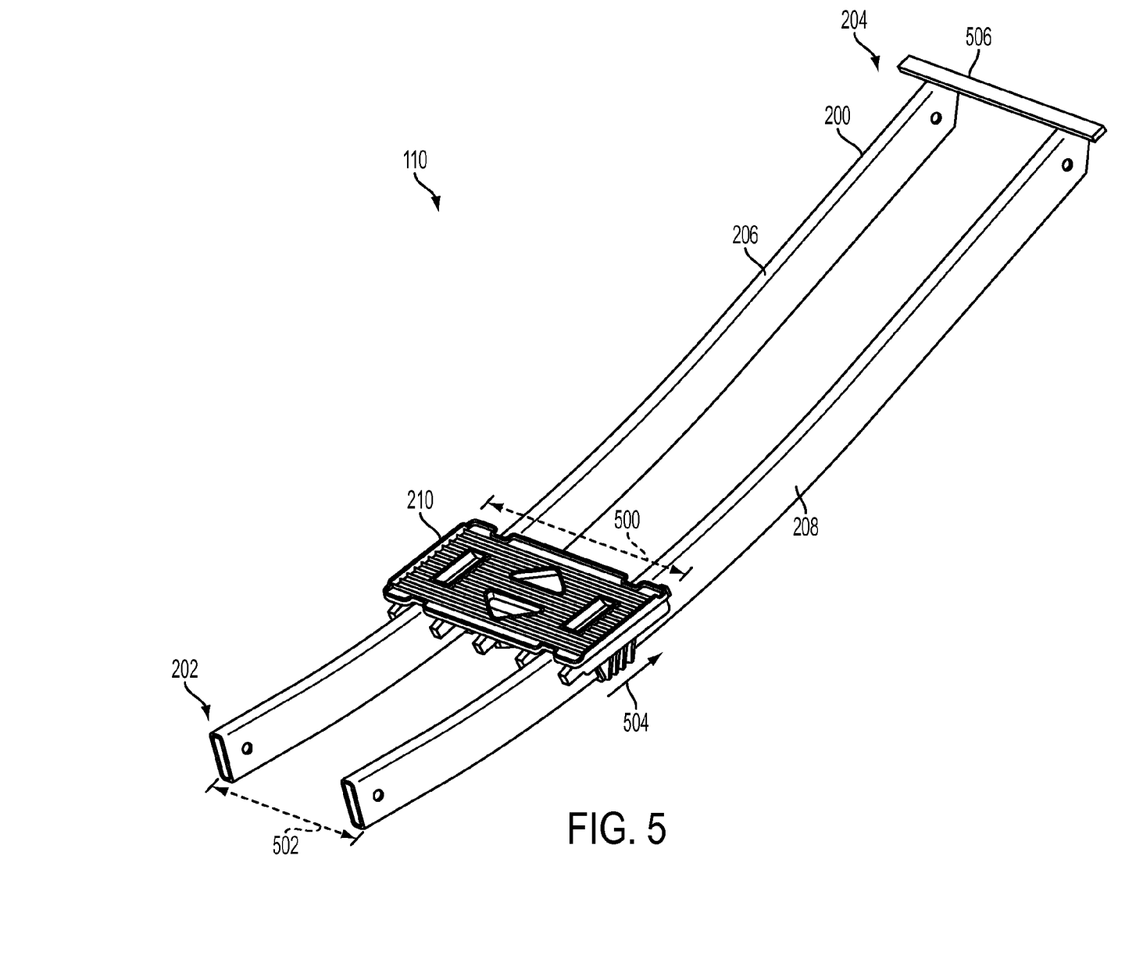
FIG. 5 is a perspective view of the example tread portion of FIGS. 3 and 4 in attachment with an example rail portion.

The first ramp portion 110 can include a first rail portion 200. The first rail portion 200 is partially visible in FIG. 2, but is also illustrated in FIG. 5. Referring to FIG. 2, the first rail portion 200 can extend along a first non-linear axis. The first non-linear axis can include a curve, bend, undulation, or the like. In this example, the first non-linear axis has a generally concave shape, though other shapes are envisioned.

The first rail portion 200 can extend between a first end 202, which is supported on the first surface 102, and an opposing second end 204. The first rail portion 200 includes any number of lengths between the first end 202 and the second end 204, such as, for example, between about 0.3 meters (~1 foot) to about 1.5 meters (~5 feet).

The first rail portion 200 can include a first rail 206 and a second rail 208. The first rail 206 and the second rail 208 are spaced apart and extend between the first end 202 and the second end 204. The first rail 206 and the second rail 208 can extend generally parallel to each other along the first non-linear axis. In this example, the first rail 206 and the second rail 208 have a generally identical size, shape, configuration, etc. While the first rail portion 200 includes two rails in this example, the first rail portion 200 is not so limited. Rather, in other examples, the first rail portion 200 may include one or more rails (e.g., the first rail 206 and/or the second rail 208 and/or additional rails). In an example, the first rail portion 200 can include the first rail 206 without the second rail 208, such that the first rail portion 200 includes one rail. The first rail portion 200 (e.g., the first rail 206 and/or the second rail 208) includes any number of materials, including metal materials (e.g., aluminum, steel, etc.), composite materials, polymeric materials (e.g., plastics, structural foams, etc.), or combinations thereof.

The first ramp portion 110 can include at least one first tread portion 210 that may be removably attached to the first rail portion 200. The at least one first tread portion 210 includes any number of tread portions (e.g., one or more). In this example, the first tread portions 210 can be generally identical in size, shape, and structure. The at least one first tread portion 210 can support the weight 120 (e.g., vehicle, atv, snowmobile, etc.) when the at least one first tread portion 210 is attached to the first rail portion 200. The first tread portion 210 can include any number of materials, including a structural foam material, a plastic material (e.g., an injection molded plastic, etc.), polymer materials, metal materials (e.g., steel, aluminum, etc.) or the like.

The first ramp portion 110 can include a first end tread 212. The first end tread 212 may be positioned at the first end 206 of the first ramp portion 110. In an example, the first end tread 212 includes a lip portion 214 that projects outwardly in a direction away from the first tread portions 210. The lip portion 214 can engage/contact the first surface 102 when the first end 202 of the first ramp portion 110 is supported on the first surface 102. The first end tread 212 can be attached to the first rail portion 200 (e.g., the first rail 206 and the second rail 208) in any number of ways, such as with mechanical fasteners (e.g., screws, bolts, locking structures, etc.) or the like. The first end tread 212 can include any number of materials, including a structural foam material, a plastic material (e.g., an injection molded plastic, etc.), polymer materials, metal materials (e.g., steel, aluminum, etc.) or the like.

Figure 6:
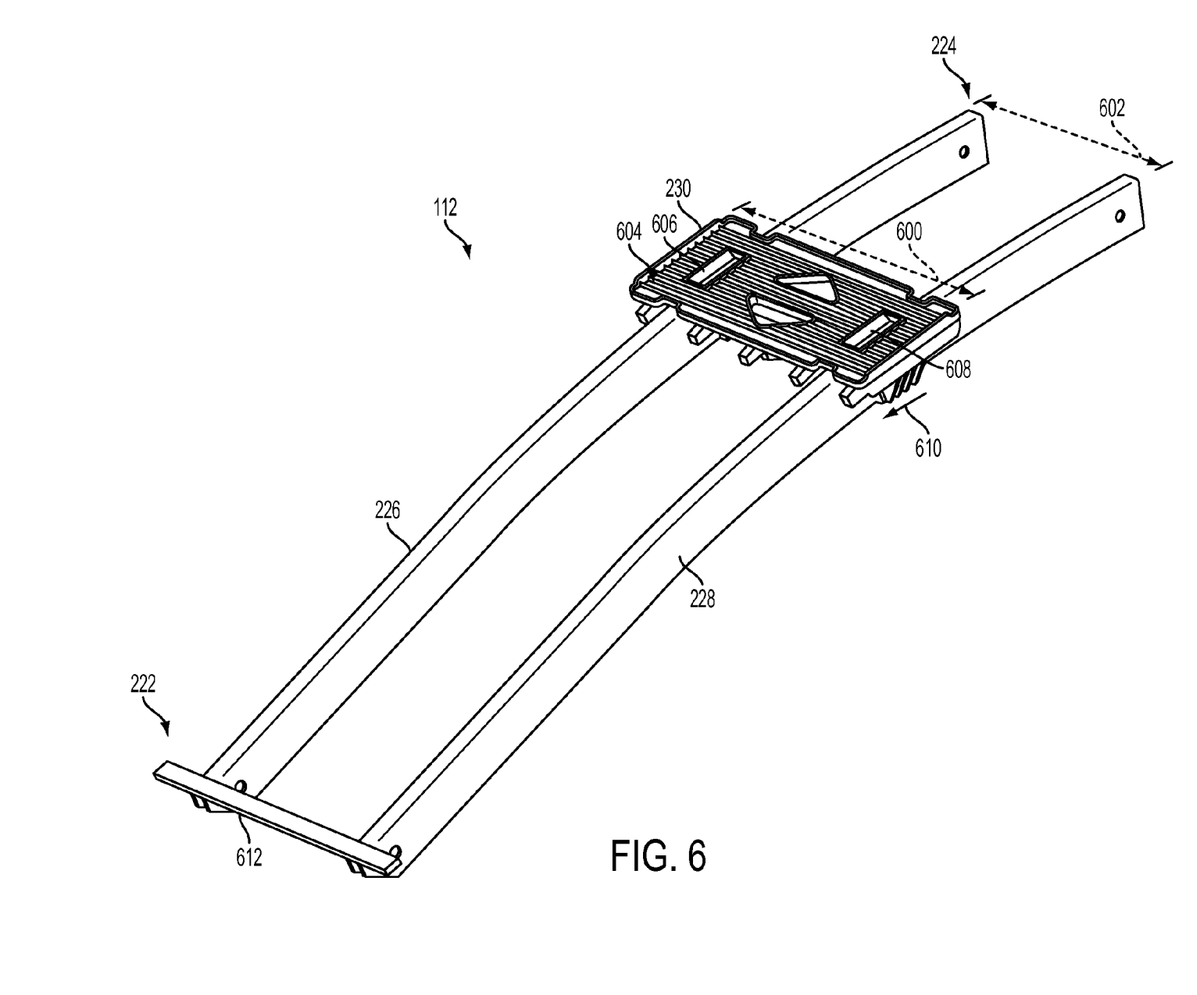
FIG. 6 is a perspective view of the example tread portion of FIGS. 3 and 4 in attachment with an example rail portion.

The loading ramp 100 may include the second ramp portion 112. In some examples, the second ramp portion 112 can be positioned at a higher elevation than the first ramp portion 110. The second ramp portion 112 can include a second rail portion 220. The second rail portion 220 is obscured from view in FIG. 2, but is more clearly illustrated in FIG. 6. Referring to FIGS. 2 and 6, the second rail portion 220 can extend along a second non-linear axis. The second non-linear axis can include a curve, bend, undulation, or the like. In this example, the second non-linear axis has a generally convex shape, though other shapes are envisioned. In the illustrated example, the second non-linear axis is a mirror image duplication of the first non-linear axis. Accordingly, the first ramp portion 110 and the second ramp portion 112 have substantially opposite shapes, such that the loading ramp 100 has a generally S-shaped curve.

The second rail portion 220 can extend between a third end 222, which is attached to the second end 204 of the first rail portion 200, and an opposing fourth end 224. The fourth end 224 of the second rail portion 220 can be supported on the second surface 104. The second rail portion 220 includes any number of lengths between the third end 222 and the fourth end 224, such as, for example, between about 0.3 meters (~1 foot) to about 1.5 meters (~5 feet). In an example, the length of the first rail portion 200 is substantially equal to the length of the second rail portion 220.

The second rail portion 220 can include a third rail 226 and a fourth rail 228 (third rail 226 and fourth rail 228 illustrated in FIG. 6). The third rail 226 and the fourth rail 228 are spaced apart and extend between the third end 222 and the fourth end 224. The third rail 226 and the fourth rail 228 can extend generally parallel to each other along the second non-linear axis. In this example, the third rail 226 and the fourth rail 228 have a generally identical size, shape, configuration, etc.

While the second rail portion 220 includes two rails in this example, the second rail portion 220 is not so limited. Rather, in other examples, the second rail portion 220 may include one or more rails (e.g., the third rail 226 and/or the fourth rail 228 and/or additional rails). In an example, the second rail portion 220 can include the third rail 226 without the fourth rail 228, such that the second rail portion 220 includes one rail. The second rail portion 220 (e.g., the third rail 226 and the fourth rail 228) includes any number of materials, including metal materials (e.g., aluminum, steel, etc.), composite materials, polymeric materials (e.g., plastics, structural foams, etc.), or combinations thereof.

The second ramp portion 112 can include at least one second tread portion 230 that may be removably attached to the second rail portion 220. The at least one second tread portion 230 includes any number of tread portions (e.g., one or more). In this example, the second tread portion 230 can be generally identical in size, shape, and structure. The at least one second tread portion 230 can support the weight 120 (e.g., vehicle, atv, snowmobile, etc.) when the at least one second tread portion 230 is attached to the second rail portion 220. The second tread portion 230 can include any number of materials, including a structural foam material, a plastic material (e.g., an injection molded plastic, etc.), polymer materials, metal materials (e.g., steel, aluminum, etc.) or the like.

The second ramp portion 112 can include a second end tread 232. The second end tread 232 may be positioned at the fourth end 224 of the second ramp portion 112. In an example, the second end tread 232 includes a lip portion 234 that projects outwardly in a direction away from the second tread portions 230. The lip portion 234 can engage/contact the second surface 104 when the fourth end 224 of the second ramp portion 112 is supported on the second surface 104. The second end tread 232 can be attached to the second rail portion 220 in any number of ways, such as with mechanical fasteners (e.g., screws, bolts, locking structures, etc.) or the like. The second end tread 224 can include any number of materials, including a structural foam material, a plastic material (e.g., an injection molded plastic, etc.), polymer materials, metal materials (e.g., steel, aluminum, etc.) or the like.

The first ramp portion 110 and the second ramp portion 112 can be attached in any number of ways. In an example, the loading ramp 100 may include a hinge portion 240 that can attach the first ramp portion 110 to the second ramp portion 112. The hinge portion 240 may be located at a midpoint of the loading ramp 100. The hinge portion 240 can include a first hinge bracket 242 that is movably attached with respect to a second hinge bracket 244. The first hinge bracket 242 can be attached to the first rail portion 200. For example, one or more first fasteners 246 can attach the first hinge bracket 242 to the first rail 206 and/or the second rail 208. The second hinge bracket 244 can be attached to the second rail portion 220. For example, one or more second fasteners 248 can attach the second hinge bracket 244 to the third rail 226 and/or the fourth rail 228. As such, the hinge portion 240 can attach the third end 222 of the second rail portion 220 to the second end 204 of the first rail portion 200 such that the first rail portion 200 and the second rail portion 220 are movable with respect to each other about the hinge portion 240.

Figure 3:
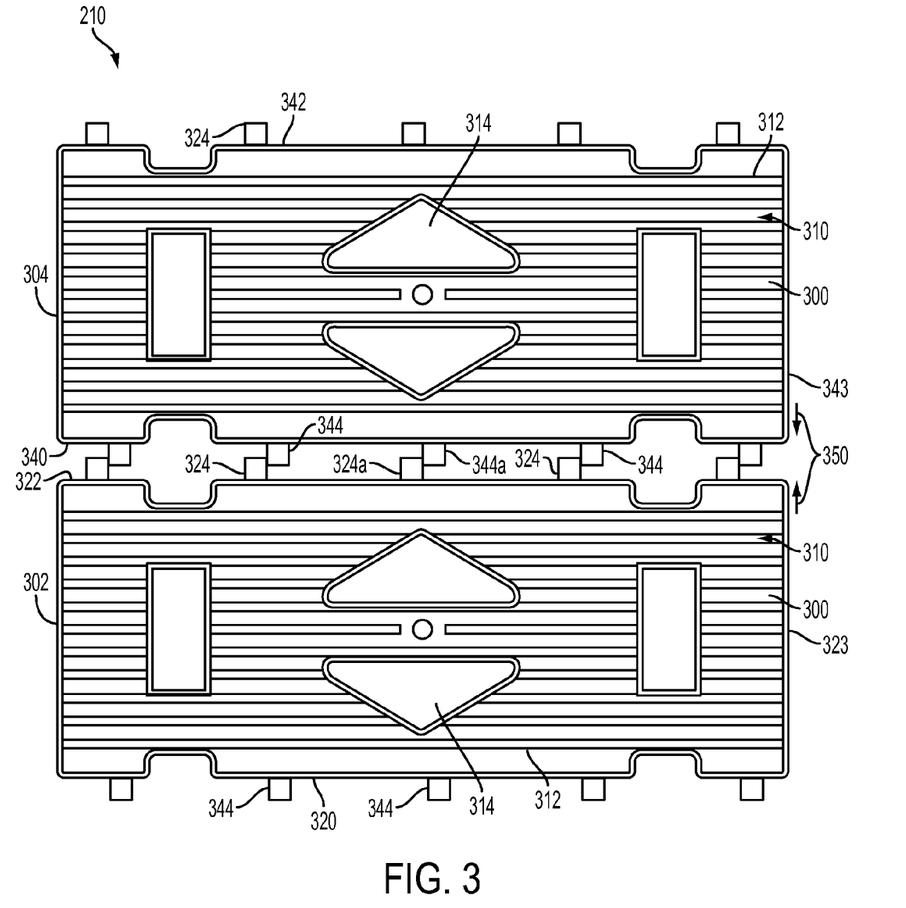
FIG. 3 is a top-down view of an example tread portion.

Turning to FIG. 3, a top down perspective view of an example of the first tread portion 210 is illustrated. It will be appreciated that the first tread portion 210 is generally identical in size, shape, structure, construction, configuration, etc. as the second tread portion 230. Accordingly, the description of the first tread portion 210 is generally identical to a description of the second tread portion 230 such that the second tread portion 230 need not be illustrated or described in detail again.

A first support side 300 of the first tread portion 210 is illustrated. In an example, the first support side 300 defines an upper side/surface of the first tread portion 210, such that the first support side 300 can contact and support the weight 120. In the illustrated example, the first tread portion 210 may include a plurality of treads, including a first tread 302 and a second tread 304. It is to be appreciated that two treads are illustrated herein for the purpose of showing the relationship/engagement between two adjacent treads. In operation, the remaining, unillustrated treads may be generally identical to the first tread 302 and the second tread 304 illustrated in FIG. 3. Accordingly, as used herein, the first tread portion 210 may include one or more treads/tread portions.

The first tread 302 and the second tread 304 of the first tread portion 210 can include one or more surface features 310. In an example, the surface features 310 can improve/enhance the frictional engagement and gripping ability between the treads 302, 304 and the weight 120 (e.g., vehicle tires, for example). Any number of different types of surface features 310 are envisioned, and it is to be appreciated that FIG. 3 illustrates some examples of the surface features 310.

In the illustrated example, the surface features 310 can include one or more channels 312 spaced apart along the first support side 300. The channels 312 can extend across the treads 302, 304 in a direction that is substantially perpendicular to the first non-linear axis along which the first rail portion 200 extends. The channels 312 define grooves, openings, passageways, indentations, or the like formed in the first support side 300 of the first tread portion 210. The channels 312 are not limited to defining grooves, openings, passageways, indentations, etc., and in other examples, can include a raised surface, bumps, projections, etc. In these examples, the channels 312 can extend substantially entirely across the treads 302, 304 from one side to an opposing side.

The surface features can additionally or alternatively include one or more openings 314. In this example, the openings 314 define holes, gaps, spaces, or the like that extends through the first support side 300 of the first tread portion 210. The openings 314 comprise any number of shapes, such as rectangularly shaped openings, triangularly shaped openings, etc. The openings 314 can provide a number of benefits. For example, the openings 314 can allow for debris, liquid, etc. to drain from the first support side 300 of the first tread portion 210. In such an example, precipitation (e.g., water, snow, mud, liquids, etc.) is generally limited from accumulating on the first support side 300. Additionally, the openings 314 can enhance/improve gripping ability between the weight 120 (e.g., vehicle tires) and the first support side 300.

The first tread 302 extends between a first side 320 and a second side 322. The first side 320 and the second side 322 are substantially opposite each other, and can extend along a direction that is substantially perpendicular to the first non-linear axis along which the first rail portion 200 extends. The first tread 302 has a generally rectangular shape, though in other examples, may include a circular shape, oval shape, quadrilateral (e.g., square, etc.) shape, or the like.

The first tread 302 can include one or more mating portions. For example, the second side 322 of the first tread 302 can include a first mating portion 324. In this example, the first mating portion 324 projects outwardly from the first tread 302 towards an adjacent tread (e.g., towards the second tread 304 in this example). The first mating portions 324 are located under a first panel 323 that defines the first support side 300. Indeed, referring briefly to FIG. 4, the first mating portions 324 project from underneath the first panel 323. The first mating portion 324 can include one or more mating portions, with each of the mating portions defining a tab, projection, finger, or other similar outcropping. The first mating portions 324 can be spaced apart along the first side 320 such that a gap or space is located between adjacent first mating portions 324.

Turning now to the second tread 304, the second tread 304 extends between a third side 340 and a fourth side 342. The third side 340 and the fourth side 342 are substantially opposite each other, and can extend along a direction that is substantially perpendicular to the first non-linear axis along which the first rail portion 200 extends. The second tread 304 has a generally rectangular shape, though in other examples, may include a circular shape, oval shape, quadrilateral (e.g., square, etc.) shape, or the like. In the illustrated example, the second side 322 of the first tread 302 may be adjacent to the third side 340 of the second tread 304.

The second tread 304 can include one or more mating portions. For example, the third side 340 of the second tread 304 can include a second mating portion 344. In this example, the second mating portion 344 projects outwardly from the second tread 304 towards an adjacent tread (e.g., towards the first tread 302 in this example). The second mating portions 344 are located under a second panel 343 that defines the first support side 300 such that the second mating portions 344 project from underneath the second panel 343. The second mating portion 344 can include one or more mating portions, with each of the mating portions defining a tab, projection, finger, or other similar outcropping. The second mating portion 344 can be spaced apart along the third side 340 such that a gap or space is located between adjacent second mating portions 344.

In the illustrated example, the first mating portions 324 of the first tread 302 may be laterally offset from the second mating portions 344 of the second tread 304. For example, one of the first mating portions 324a is positioned in proximity to one of the second mating portions 344a. In such an example, the one of the first mating portions 324a is laterally offset and positioned along a side of the one of the second mating portions 344a.

In the illustrated example, the first tread 302 and the second tread 304 can be moved 350 (movement illustrated generically/schematically with arrowhead) towards each other. Additionally, the first mating portions 324 are located under the first panel 323 of the first tread 302 while the second mating portions 344 are located under the second panel 343 of the second tread 304. As such, the second side 322 of the first tread 302 can contact/engage the third side 340 of the second tread 304 as the first tread 302 and the second tread 304 are moved 350.

Once the second side 322 of the first tread 302 contacts the third side 340 of the second tread 304, the first mating portions 324 can engage the second mating portions 344 to limit movement of the first tread 302 with respect to the second tread 304. For example, the first mating portions 324 are positioned along a side of the second mating portions 344 in this position. As such, the first mating portions 324 and the second mating portions 344 can contact each other to limit this movement (e.g., lateral movement in a direction perpendicular to the movement 350). Accordingly, inadvertent movement of the first tread with respect to the second tread 304 is limited/reduced.

Figure 4:
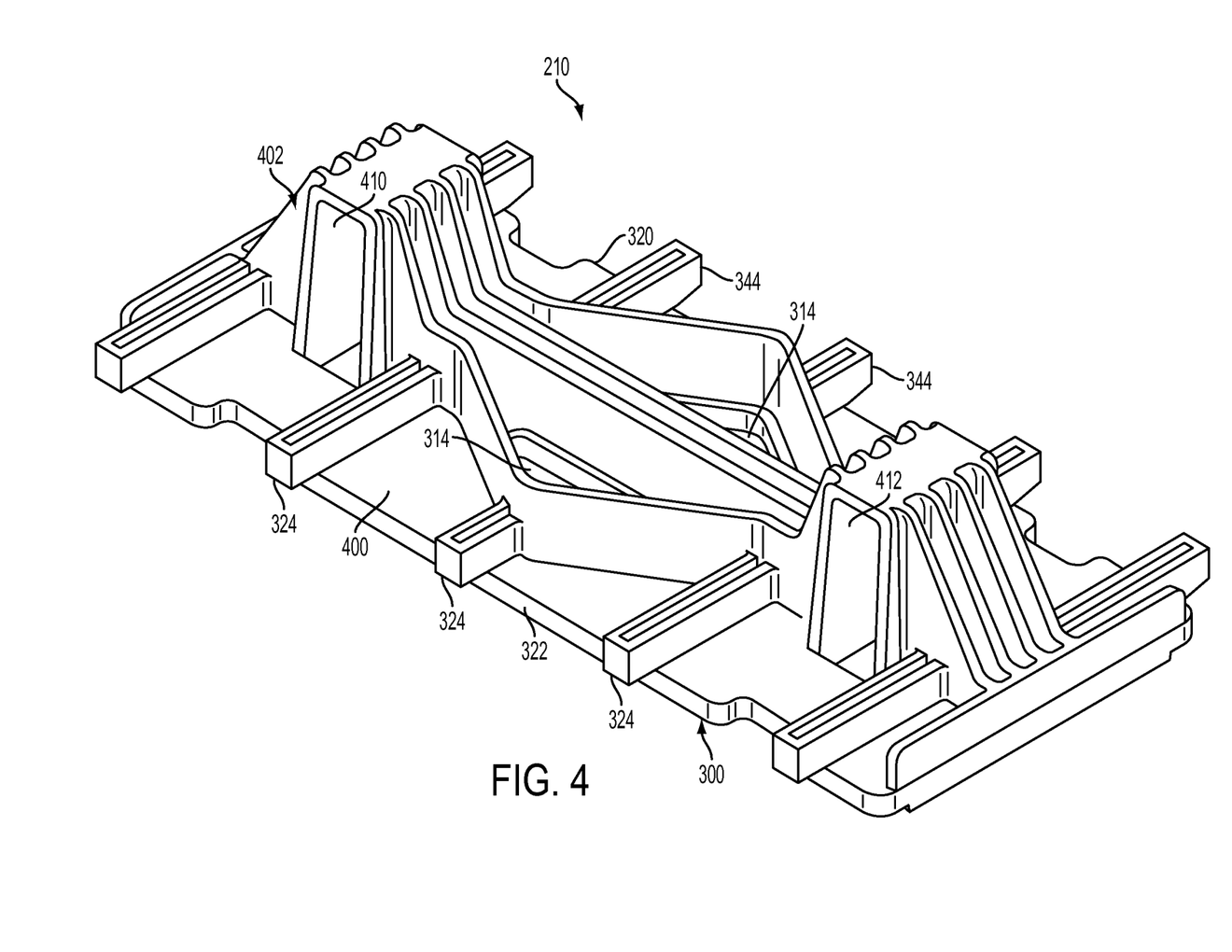
FIG. 4 is a bottom-up perspective view of the example tread portion of FIG. 3

Turning to FIG. 4, a bottom up perspective view of the first tread 302 of the first tread portion 210 is illustrated. In this example, a second support side 400 is illustrated that is opposite the first support side 300 (illustrated in FIG. 3). While the first tread 302 (and not the second tread 304) is illustrated in FIG. 4, it will be appreciated that the second support side of the second tread 304 is generally identical to the second support side 400 of the first tread 302 that is illustrated in FIG. 4.

The first tread portion 210 extends between the first support side 300 and the opposing second support side 400. The first tread portion 210 defines one or more first tread openings 402 into which the first rail portion 200 is removably received when the first tread portion 210 is removably attached to the first rail portion 200. While the first tread openings 402 include any number of openings (e.g., one or more), in this example, the first tread openings 402 include a first opening 410 and a second opening 412.

The first opening 410 and the second opening 412 are generally identical in size, shape and structure. In this example, the first opening 410 and the second opening 412 are spaced apart such that the first opening 410 is located at one end of the first tread portion 210 while the second opening 412 is located at an opposing end of the first tread portion 210. The first opening 410 and the second opening 412 can be spaced apart a distance that substantially matches a distance between the first rail 206 and the second rail 208. In this example, the first opening 410 and the second opening 412 have generally matching shapes (e.g., rectangular) as the first rail 206 and the second rail 208. However, in other examples, since the first rail 206 and the second rail 208 may include non-rectangular shapes (e.g., circular, oval, quadrilateral, etc.), the first opening 410 and the second opening 412 can likewise include matching non-rectangular shapes (e.g., circular, oval, quadrilateral, etc.).

It is to be appreciated that the second tread portion 230 is generally identical to the first tread portion 210 illustrated in FIG. 4. For example, the second tread portion 230 can define a second tread opening (e.g., identical in size, shape and structure to the first tread opening 402) into which the second rail portion 220 can be removably received when the at least one second tread portion 230 is removably attached to the second rail portion 220. Along these lines, the second tread opening (e.g., identical to the first tread opening 402) can include a first opening (e.g., identical to the first opening 410) for receiving the third rail 226 and a second opening (e.g., identical to the second opening 412) for receiving the fourth rail 228.

Turning to FIG. 5, an example of a portion of the first ramp portion 110 is illustrated. In this example, the first rail portion 200, including the first rail 206 and the second rail 208, is illustrated along with the first tread portion 210 being removably attached to the first rail portion 200. It is to be appreciated that merely one first tread portion 210 is illustrated so as to illustrate the engagement between the first tread portion 210 and the first rail portion 200. In operation, however, the first ramp portion 110 can include a plurality of first tread portions 210, in a similar manner as illustrated in FIG. 1.

In this example, the first tread portion 210 includes a first tread width 500. The first tread width 500 is measured across the first tread portion 210 between lateral sides of the first tread portion 210. The first rail 206 and the second rail 208 can be separated a separating distance 502. In an example, the separating distance 502 may be less than the first tread width 500.

The first rail portion 200 can be received within the first tread opening 402. In particular, the first rail 206 and the second rail 208 of the first rail portion 200 can be received within the first opening 410 and the second opening 412, respectively, of the first tread portion 210. The first tread portion 210 can then be moved 504 (movement direction 504 illustrated generically/schematically with arrowhead) along the first rail portion 200 from the first end 202 to the second end 204. To remove the first tread portion 210 from the first rail portion 200, the first tread portion 210 can be moved in a direction opposite the movement direction 504.

The first ramp portion 110 can include a first support structure 506 positioned at the second end 204 of the first rail portion 200. The first support structure 506 includes a bar, rail, or other similar structure that has at least some degree of rigidity/inflexibility. The first support structure 506 can be attached at one end to the first rail 206 and at an opposing end to the second rail 208. As such, the first support structure 506 can support/hold/maintain the first rail 206 and the second rail 208 at the separating distance 502. The first support structure 506 includes any number of materials, including metal materials (e.g., steel, aluminum, etc.) or the like.

As the first tread portion 210 is moved 504 along the first rail portion 200, the first tread portion 210 can contact/engage the first support structure 506. As such, the first tread portion 210 is limited from inadvertently being dislodged/removed from the first rail portion 200. The remaining first tread portions 210 can be attached to the first rail portion 200 in a similar manner by moving 504 the first tread portions 210 towards the second end 204.

Turning to FIG. 6, an example of a portion of the second ramp portion 112 is illustrated. In this example, the second rail portion 220, including the third rail 226 and the fourth rail 228, is illustrated along with the second tread portion 230 being removably attached to the second rail portion 220. It is to be appreciated that merely one second tread portion 230 is illustrated so as to illustrate the engagement between the second tread portion 230 and the second rail portion 220. In operation, however, the second ramp portion 112 can include a plurality of second tread portions 230, in a similar manner as illustrated in FIG. 1.

In this example, the second tread portion 230 includes a second tread width 600. The second tread width 600 is measured across the second tread portion 230 between lateral sides of the second tread portion 230. The third rail 226 and the fourth rail 228 can be separated a separating distance 602. In an example, the separating distance 602 may be less than the second tread width 600. In an example, the first tread width 500 is substantially equal to the second tread width 600 while the separating distance 502 is substantially equal to the separating distance 602.

The second rail portion 220 can be received within a second tread opening 402. In particular, the third rail 226 and the fourth rail 228 of the second rail portion 220 can be received within a first opening 606 and a second opening 608, respectively, of the second tread portion 230. The second tread portion 230 can then be moved 610 (movement direction 610 illustrated generically/schematically with arrowhead) along the second rail portion 220 from the fourth end 224 to the third end 222. To remove the second tread portion 230 from the second rail portion 220, the second tread portion 230 can be moved in a direction opposite the movement direction 610.

The second ramp portion 112 can include a second support structure 612 positioned at the third end 222 of the second rail portion 220. The second support structure 612 includes a bar, rail, or other similar structure that has at least some degree of rigidity/inflexibility. The second support structure 612 can be attached at one end to the third rail 226 and at an opposing end to the fourth rail 228. As such, the second support structure 612 can support/hold/maintain the third rail 226 and the fourth rail 228 at the separating distance 602. The second support structure 612 includes any number of materials, including metal materials (e.g., steel, aluminum, etc.) or the like.

As the second tread portion 230 is moved 610 along the second rail portion 220, the second tread portion 230 can contact/engage the second support structure 612. As such, the second tread portion 230 is limited from inadvertently being dislodged/removed from the second rail portion 220. The remaining second tread portions 230 can be attached to the second rail portion 220 in a similar manner by moving 610 the second tread portions 230 towards the third end 222.

Figure 7:
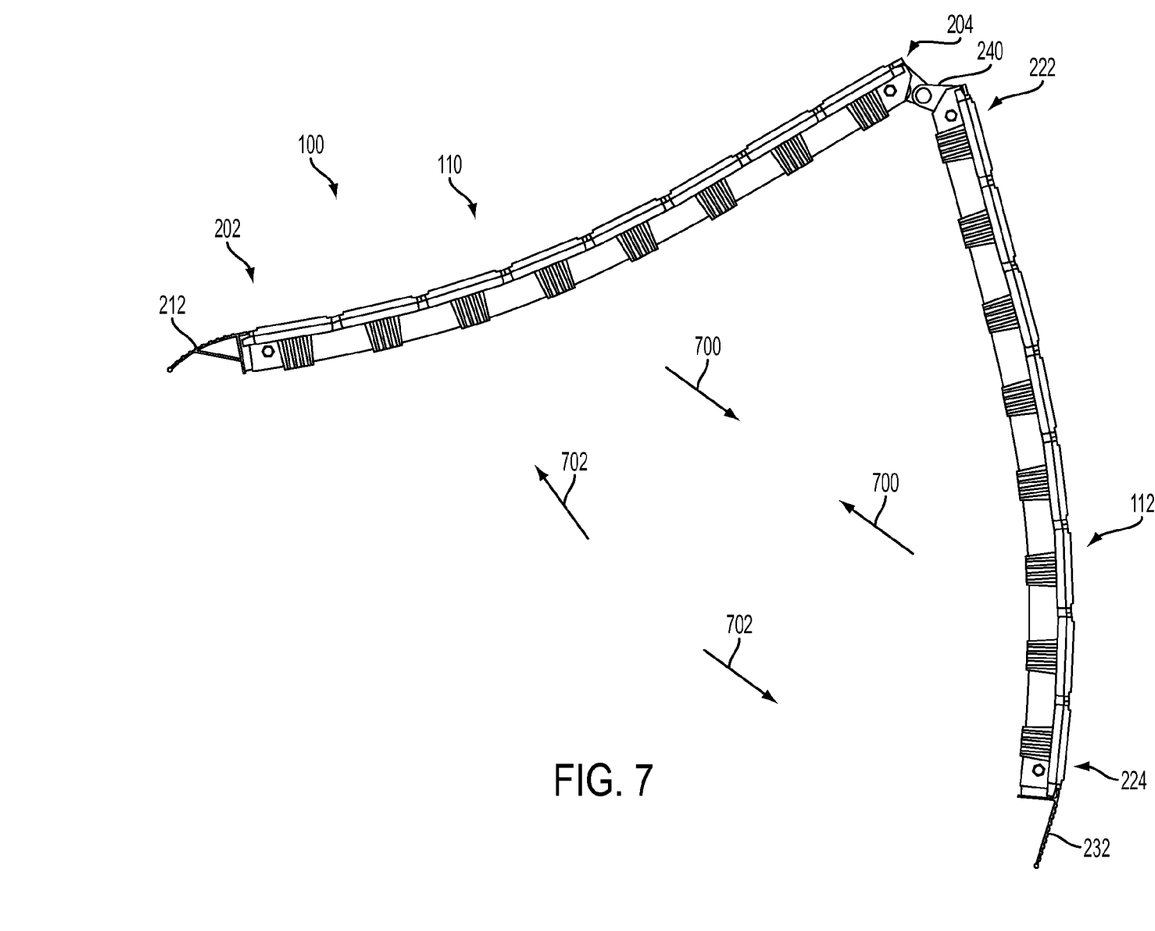
FIG. 7 is a side view of the example loading ramp of FIG. 1 in a partially extended position.
Figure 8:
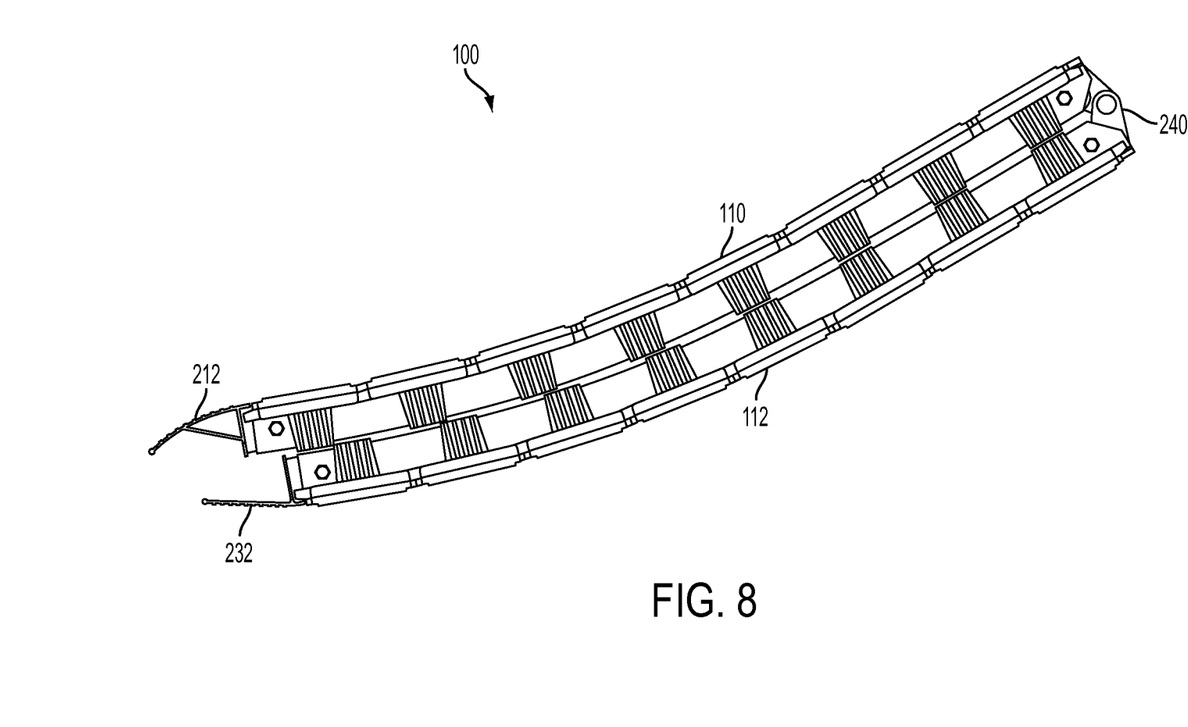
FIG. 8 is a side view of the example loading ramp of claim 7 in a folded position.

Turning to FIGS. 7 and 8, the loading ramp 100 can be moved between an extended position (FIG. 1), a partially extended position (FIG. 7) and a folded position (FIG. 8). In an example, the second ramp portion 112 is movable with respect to the first ramp portion 110 between the extended position and the folded position. In the extended position, as illustrated in FIG. 1, the first ramp portion 110 may be supported on the first surface 102 and the second ramp portion 112 may be supported on the second surface 104.

The first ramp portion 110 and the second ramp portion 112 are movable with respect to each other in a first movement direction 700. For example, from the extended position, the first ramp portion 110 and/or the second ramp portion 112 can be moved along the first movement direction 700, such that a distance separating the first ramp portion 110 and the second ramp portion 112 is reduced. This movement can be caused by the hinge portion 240 which movably attaches the first ramp portion 110 to the second ramp portion 112.

The first ramp portion 110 and the second ramp portion 112 can move with respect to each other in the first movement direction 700 at least until the first ramp portion 110 and the second ramp portion 112 can nest with each other, whereupon the loading ramp 100 is in the folded position (FIG. 8). In the folded position, the first ramp portion 110 and the second ramp portion 112 are nested, such that a minimal space exists between the first ramp portion 110 and the second ramp portion 112. Due to the shapes (e.g., extending along nonlinear axis) of the first ramp portion 110 and the second ramp portion 112, in the folded position, the first ramp portion 110 has a substantially matching shape to the second ramp portion 112. As such, this nesting of the first ramp portion 110 and the second ramp portion 112 reduces a total amount of space that the first ramp portion 110 takes up when in the folded position.

To move from the folded position to the extended position, the first ramp portion 110 and the second ramp portion 112 can move with respect to each other in a second movement direction 702 (illustrated in FIG. 7). In such an example, the second movement direction 702 is substantially opposite from the first movement direction 700. As either or both of the first ramp portion 110 and the second ramp portion 112 move along the second movement direction 702, a distance separating the first ramp portion 110 and the second ramp portion 112 is increased. The first ramp portion 110 and the second ramp portion 112 can continue to move along the second movement direction 702 at least until the loading ramp 100 is in the extended position, which is illustrated in FIG. 1.

Figure 9:
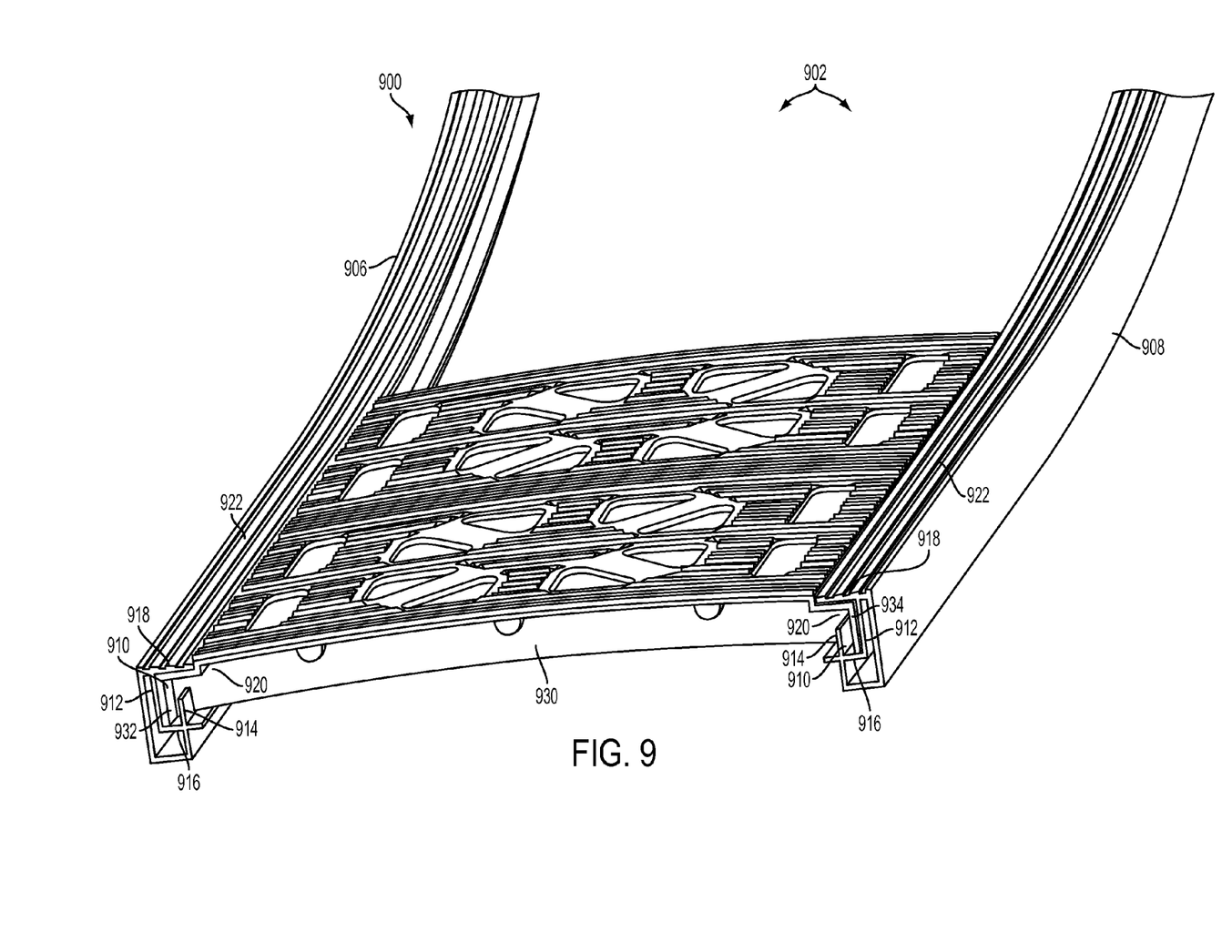
FIG. 9 is an end view of a second example loading ramp.

Turning to FIG. 9, a second example loading ramp 900 is illustrated. The second loading ramp 900 is similar in some respects to the loading ramp 100 illustrated and described with respect to FIGS. 1 to 8. For example, the second loading ramp 900 can include the first ramp portion 110 and the second ramp portion 112 attached together by the hinge portion 240. The second loading ramp 900 can be supported between the first surface 102 and the second surface 104.

The second loading ramp 900 can include a first rail portion 902 having a first rail 906 and a second rail 908. In this example, the first rail portion 902 includes a tread opening 910 defined within each of the first rail 906 and the second rail 908. The tread opening 910 is defined within one or more walls. For example, the tread opening 910 is defined by an outer wall 912, an inner wall 914, a lower wall 916 and a top wall 918. In this example, the inner wall 914 is spaced a distance apart from the top wall 918 to define a gap 920 therebetween. In this example, the top wall 918 can include a surface feature 922 that assists in supporting the weight 120. The surface feature 922 can include, for example, grooves, channels, ridges, etc. that can increase friction/contact with the weight 120.

The second loading ramp 900 can include a first tread portion 930. The first tread portion 930 can engage the first rail portion 902, such that the first tread portion 930 can be removably attached to the first rail portion 902. The first tread portion 930 can include a first attachment portion 932 and a second attachment portion 934. The first attachment portion 932 and the second attachment portion 934 include any number of sizes and shapes. In this example, the first attachment portion 932 can be removably attached to the first rail 906 while the second attachment portion 934 can be removably attached to the second rail 908. For example, the first attachment portion 932 and the second attachment portion 934 can be received within the tread openings 910. The first attachment portion 932 and the second attachment portion 934 can be attached to opposing sides of the first tread portion 930 by extending through the gaps 920.

Figure 10:
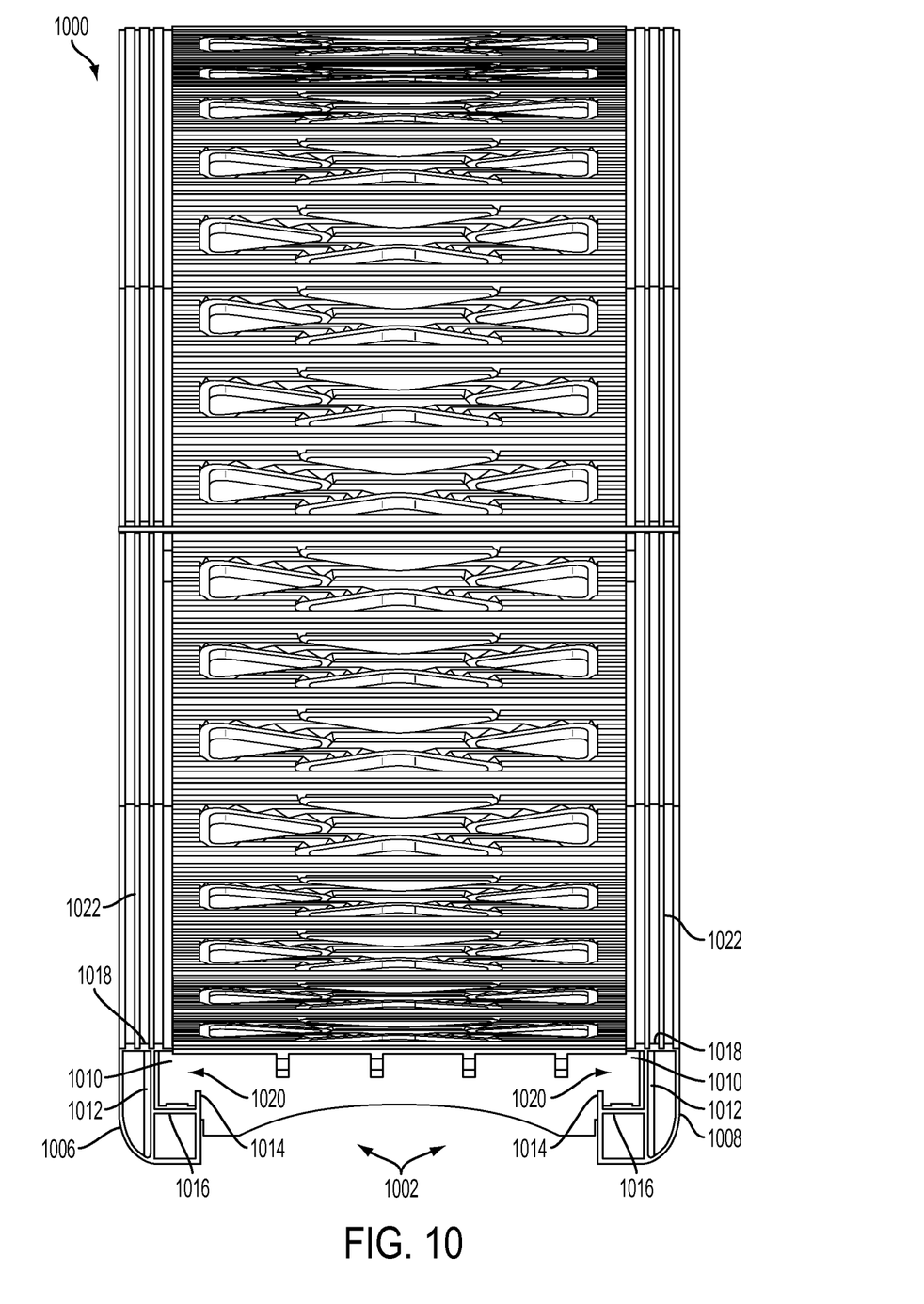
FIG. 10 is an end view of a third example loading ramp.

Turning to FIG. 10, a third example loading ramp 1000 is illustrated. The third loading ramp 1000 is similar in some respects to the loading ramp 100 and the second loading ramp 900 illustrated and described with respect to FIGS. 1 to 9. For example, the third loading ramp 1000 can include the first ramp portion 110 and the second ramp portion 112 attached together by the hinge portion 240. The third loading ramp 1000 can be supported between the first surface 102 and the second surface 104.

The third loading ramp 1000 can include a first rail portion 1002 having a first rail 1006 and a second rail 1008. In this example, the first rail portion 1002 includes a tread opening 1010 defined within each of the first rail 1006 and the second rail 1008. The tread opening 1010 is defined within one or more walls. For example, the tread opening 1010 is defined by an outer wall 1012, an inner wall 1014, a lower wall 1016 and a top wall 1018. In this example, the inner wall 1014 is spaced a distance apart from the top wall 1018 to define a gap 1020 therebetween. In this example, the top wall 1018 can include a surface feature 1022 that assist in supporting the weight 120 (e.g., by increasing friction/contact). The surface feature 1022 can include, for example, grooves, channels, ridges, etc. that can increase friction/contact with the weight 120.

Figure 11:
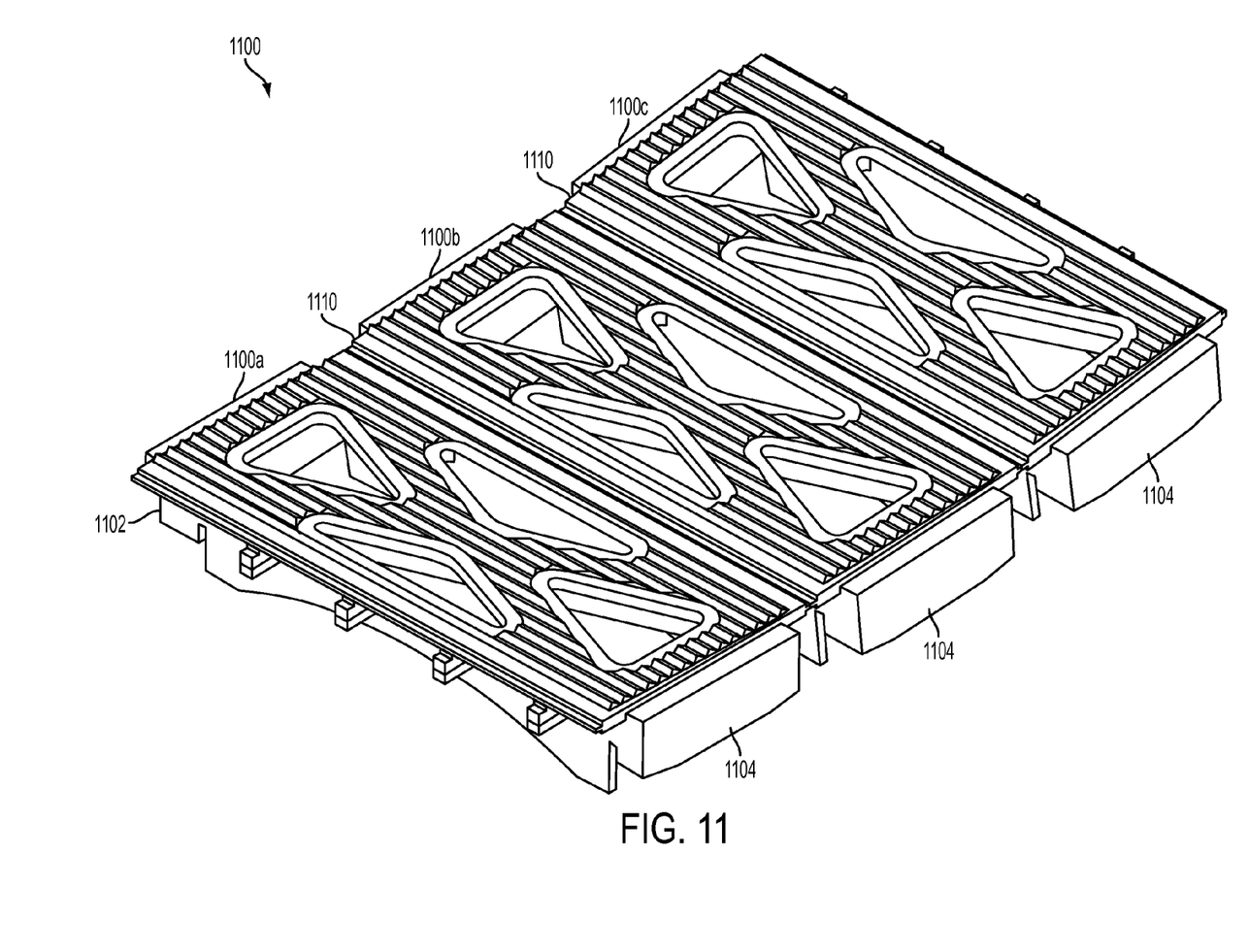
FIG. 11 is a perspective view of an example tread portion for use with the third example loading ramp of FIG. 10.

Referring now to FIGS. 10 and 11, the third loading ramp 1000 can include a first tread portion 1100. The first tread portion 1100 can engage the first rail portion 1002, such that the first tread portion 1100 can be removably attached to the first rail portion 1002. The first tread portion 1100 can include a first attachment portion 1102 and a second attachment portion 1104. The first attachment portion 1102 and the second attachment portion 1104 include any number of sizes and shapes. In this example, the first attachment portion 1102 and the second attachment portion 1104 are sized/shaped to be received within the tread openings 1010. For example, the first attachment portion 1102 can be removably attached to the first rail 1006 by being received within the tread opening 910 within the first rail 1006. Similarly, the second attachment portion 1104 can be removably attached to the second rail 1008 by being received within the tread opening 910 within the second rail 1008. The first attachment portion 1102 and the second attachment portion 1104 can be attached to opposing sides of the first tread portion 1100 by extending through the gaps 1020.

It is to be appreciated that the first tread portion 1100 in FIG. 11 is illustrated as including a plurality of tread portions, such as a first tread 1100*a*, a second tread 1100*b*, and a third tread 1100*c*. In this example, the treads 1100*a*, 1100*b*, 1100*c* can be attached to each other by a hinge 1110 (e.g., a living hinge), such that the treads 1100*a*, 1100*b*, 1100*c* are movable with respect to each other. The first tread portion 1100 is not so limited, however, and in other examples, may include any number of treads (e.g., one or more).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first rail and a second rail generally correspond to rail A and rail B or two different or two identical rails or the same rail.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A loading ramp configured to be supported between a first surface and a second surface, the loading ramp including:
   a first ramp portion configured to be supported on the first surface, the first ramp portion including:
   a first rail portion extending between a first end, which is supported on the first surface, and an opposing second end, the first rail portion extending along a first non-linear axis; and
   at least one first tread portion slidably movable with respect to the first rail portion along the first non-linear axis such that the at least one first tread portion is removably attached to the first rail portion, the at least one first tread portion configured to support a weight when the least one first tread portion is attached to the first rail portion;
   a second ramp portion attached to the first ramp portion and configured to be supported on the second surface, the second ramp portion including:
   a second rail portion extending between a third end, which is attached to the second end of the first rail portion, and an opposing fourth end, which is supported on the second surface, the second rail portion extending along a second non-linear axis; and
   at least one second tread portion slidably movable with respect to the second rail portion along the second non-linear axis such that the at least one second tread portion is removably attached to the second rail portion, the at least one second tread portion configured to support the weight when the at least one second tread portion is attached to the second rail portion;
   wherein the at least one first tread portion defines a first tread opening into which the first rail portion is removably received when the at least one first tread portion is removably attached to the first rail portion the first tread opening bounded on all sides by sidewalls.

2. The loading ramp of claim 1, wherein the at least one second tread portion defines a second tread opening into which the second rail portion is removably received when the at least one second tread portion is removably attached to the second rail portion.

3. The loading ramp of claim 1, wherein the first rail portion includes a first rail and a second rail.

4. The loading ramp of claim 1, wherein the second rail portion includes a third rail and a fourth rail.

5. The loading ramp of claim 1, wherein the second ramp portion is movable with respect to the first ramp portion between an extended position, in which the first ramp portion is supported on the first surface and the second ramp portion is supported on the second surface, and a folded position, in which the first ramp portion and the second ramp portion are configured to nest with each other.

6. The loading ramp of claim 5, wherein in the folded position, the first ramp portion has a matching shape to the second ramp portion.

7. The loading ramp of claim 1, wherein the at least one first tread portion includes a first tread, which extends between a first side and a second side, and a second tread, which extends between a third side and a fourth side, the second side of the first tread adjacent to the third side of the second tread.

8. The loading ramp of claim 7, wherein the second side of the first tread includes a first mating portion, the third side of the second tread includes a second mating portion.

9. The loading ramp of claim 8, wherein the first mating portion of the first tread is laterally offset from the second mating portion of the second tread, the first mating portion configured to engage the second mating portion to limit movement of the first tread with respect to the second tread, the first mating portion projecting outwardly from the first tread towards the second tread a first distance, the second mating portion projecting outwardly from the second tread towards the first tread a second distance, wherein the first distance is substantially equal to the second distance.

10. A loading ramp configured to be supported between a first surface and a second surface, the loading ramp including:
   a first ramp portion configured to be supported on the first surface, the first ramp portion including:
   a first rail portion extending between a first end, which is supported on the first surface, and an opposing second end, the first rail portion extending along a non-linear axis; and
   at least one first tread portion slidably movable with respect to the first rail portion along the first non-linear axis such that the at least one first tread portion is removably attached to the first rail portion, the at least one first tread portion configured to support a weight when the least one first tread portion is attached to the first rail portion;
   a second ramp portion movably attached to the first ramp portion and configured to be supported on the second surface, the second ramp portion including:

a second rail portion extending between a third end, which is movably attached to the second end of the first rail portion, and an opposing fourth end, which is supported on the second surface, the second rail portion extending along a non-linear axis; and at least one second tread portion slidably movable with respect to the second rail portion along the second non-linear axis such that the at least one second tread portion is removably attached to the second rail portion, the at least one second tread portion configured to support the weight when the at least one second tread portion is attached to the second rail portion;

wherein the second ramp portion is movable with respect to the first ramp portion between an extended position, in which the first ramp portion is supported on the first surface and the second ramp portion is supported on the second surface, and a folded position, in which the first ramp portion and the second ramp portion are configured to nest with each other with the first ramp portion having a substantially matching shape to the second ramp portion;

wherein the at least one first tread portion defines a first tread opening into which the first rail portion is removably received when the at least one first tread portion is removably attached to the first rail portion the first tread opening bounded on all sides by sidewalls.

11. The loading ramp of claim 10, wherein the second surface is elevated with respect to the first surface, the second surface including a vehicle.

12. The loading ramp of claim 10, wherein the at least one first tread portion extends between a first support side and an opposing second support side, the first support side configured to support the weight.

13. The loading ramp of claim 12, wherein the second support side defines a first tread opening into which the first rail portion is configured to receive the first rail portion.

14. The loading ramp of claim 10, wherein the fourth end of the second rail portion and the second surface on which the loading ramp is supported are substantially planar with respect to each other.

15. A loading ramp configured to be supported between a first surface and a second surface, the loading ramp including:
   a first ramp portion configured to be supported on the first surface, the first ramp portion including:
      a first rail portion extending between a first end, which is supported on the first surface, and an opposing second end, the first rail portion including a first rail; and
      at least one first tread portion removably attached to the first rail of the first rail portion, the at least one first tread portion defining a first tread opening into which the first rail is removably received when the at least one first tread portion removably attached to the first rail of the first rail portion, the first tread opening bounded on a top side and a bottom side by sidewalls;
   wherein the first end of the first rail portion and the first surface on which the loading ramp is supported are substantially planar with respect to each other, the first tread opening non-planar with respect to the first tread portion such that the first rail portion, when received within the first tread opening, does not intersect a plane defined by the first tread portion.

16. The loading ramp of claim 15, wherein the at least one first tread portion includes a first tread width.

17. The loading ramp of claim 16, wherein the first rail portion includes a first rail and a second rail, the first rail and the second rail separated a separating distance.

18. The loading ramp of claim 17, wherein the separating distance is less than the first tread width.

* * * * *